United States Patent
Rentsch et al.

(10) Patent No.: US 10,633,259 B2
(45) Date of Patent: Apr. 28, 2020

(54) WET SURFACE TREATMENT OF SURFACE-MODIFIED CALCIUM CARBONATE

(71) Applicant: Omya International AG, Oftringen (CH)

(72) Inventors: Samuel Rentsch, Spiegel bei Bern (CH); Fabio Ippolito, Oftringen (CH); Patrick A. C. Gane, Rothrist (CH)

(73) Assignee: Omya International AG, Blue Ash, OH (US)

( * ) Notice: Subject to any disclaimer, the term of this patent is extended or adjusted under 35 U.S.C. 154(b) by 72 days.

(21) Appl. No.: 15/779,587

(22) PCT Filed: Jan. 3, 2017

(86) PCT No.: PCT/EP2017/050092
§ 371 (c)(1),
(2) Date: May 29, 2018

(87) PCT Pub. No.: WO2017/121661
PCT Pub. Date: Jul. 20, 2017

(65) Prior Publication Data
US 2020/0024149 A1 Jan. 23, 2020

Related U.S. Application Data

(60) Provisional application No. 62/281,241, filed on Jan. 21, 2016.

(30) Foreign Application Priority Data

Jan. 14, 2016 (EP) ..................... 16151285

(51) Int. Cl.
*C01F 11/18* (2006.01)
*C08K 3/26* (2006.01)
*C09C 1/02* (2006.01)

(52) U.S. Cl.
CPC ............... *C01F 11/18* (2013.01); *C08K 3/26* (2013.01); *C09C 1/021* (2013.01); *C01P 2004/64* (2013.01); *C01P 2006/12* (2013.01); *C01P 2006/14* (2013.01); *C01P 2006/82* (2013.01)

(58) Field of Classification Search
CPC .......... C01F 11/18; C01F 11/185; C08K 3/26; C08K 2003/265; C09C 1/02; C09C 1/021; C09C 1/022; C09C 1/024
See application file for complete search history.

(56) References Cited

U.S. PATENT DOCUMENTS

| | | | | |
|---|---|---|---|---|
| 2,927,091 A | * | 3/1960 | Liggett | C08K 9/04 524/300 |
| 4,110,267 A | * | 8/1978 | Ikeda | C08J 9/224 521/57 |
| 4,322,336 A | | 3/1982 | Machurat et al. | |
| 2002/0102404 A1 | * | 8/2002 | Nakai | C08K 9/04 428/403 |
| 2004/0020410 A1 | | 2/2004 | Gane et al. | |
| 2005/0137321 A1 | | 6/2005 | Dumont et al. | |
| 2005/0139338 A1 | * | 6/2005 | Shibatani | B41M 5/52 162/125 |
| 2006/0047023 A1 | | 3/2006 | Craig et al. | |
| 2007/0293692 A1 | * | 12/2007 | Pirrung | C08K 5/521 558/70 |
| 2012/0186765 A1 | * | 7/2012 | Nyander | D21H 21/10 162/164.6 |
| 2012/0328802 A1 | * | 12/2012 | Achatz | D21H 19/38 428/32.34 |
| 2013/0280975 A1 | | 10/2013 | Chuda | |

FOREIGN PATENT DOCUMENTS

| | | |
|---|---|---|
| CN | 103896776 A | 7/2014 |
| EP | 0172693 A2 | 2/1986 |
| EP | 0804429 A1 | 4/1996 |
| EP | 1146075 A1 | 10/2001 |
| EP | 1457459 A1 | 9/2004 |
| EP | 1548070 A1 | 6/2005 |
| EP | 1731574 A1 | 12/2006 |
| EP | 2011766 A1 | 1/2009 |
| EP | 2264108 A1 | 12/2010 |
| EP | 2264109 A1 | 12/2010 |
| EP | 2377900 A1 | 10/2011 |
| EP | 2612881 A1 | 7/2013 |
| EP | 2722368 A1 | 4/2014 |
| EP | 2843005 A1 | 3/2015 |
| EP | 2933298 A1 | 10/2015 |

(Continued)

OTHER PUBLICATIONS

International Search Report dated Feb. 22, 2017 from PCT/EP2017/050092.

(Continued)

*Primary Examiner* — Timothy C Vanoy
(74) *Attorney, Agent, or Firm* — Schwegman Lundberg & Woessner, P.A.

(57) ABSTRACT

The present invention relates to a process for the surface treatment of a surface-modified calcium carbonate, a surface-treated calcium carbonate obtained by the process as well as the use of the surface-treated calcium carbonate in a polymer composition, in paper making, paper coatings, agricultural applications, paints, adhesives, sealants, construction applications, pharma applications and/or cosmetic applications, or for cross-linking of rubber, in sheet moulding compounds, in bulk moulding compounds, in cross-linkable polyolefin system formulations, preferably for pipes and cables, in cross-linkable polyvinyl chloride, in unsaturated polyesters and in alkyd resins, and the use of the surface-treated calcium carbonate and a curing agent for crosslinking of cross-linkable compounds.

20 Claims, No Drawings

(56) References Cited

FOREIGN PATENT DOCUMENTS

| | | | | |
|---|---|---|---|---|
| JP | 06072710 A | * | 3/1994 | ............. C01F 11/18 |
| JP | H 0726051 B2 | * | 3/1995 | ............. C09D 5/06 |
| JP | 2013047343 A | * | 3/2013 | ............. C08K 9/04 |
| JP | 2013203581 A | * | 10/2013 | ............. C01F 11/18 |
| MX | PA 05003415 A | * | 9/2005 | ............. C09C 1/021 |
| WO | 9737079 A1 | | 10/1997 | |
| WO | 0020336 A1 | | 4/2000 | |
| WO | 0039222 A1 | | 7/2000 | |
| WO | 2004083316 A1 | | 9/2004 | |
| WO | 2005121257 A2 | | 12/2005 | |
| WO | 2009074492 A1 | | 6/2009 | |
| WO | 2011042340 A1 | | 4/2011 | |

OTHER PUBLICATIONS

Written Opinion of the International Searching Authority dated Feb. 22, 2017 from PCT/EP2017/050092.

* cited by examiner

WET SURFACE TREATMENT OF SURFACE-MODIFIED CALCIUM CARBONATE

CROSS-REFERENCE TO RELATED APPLICATIONS

This is a U.S. national phase of PCT Application No. PCT/EP2017/050092, filed Jan. 3, 2017, which claims priority to U.S. Provisional Application No. 62/281,241, filed Jan. 21, 2016 and European Application No. 16151285.0, filed Jan. 14, 2016.

The present invention relates to a process for the surface treatment of a surface-modified calcium carbonate, a surface-treated calcium carbonate obtained by the process as well as the use of the surface-treated calcium carbonate in a polymer composition, in paper making, paper coatings, agricultural applications, paints, adhesives, sealants, construction applications, pharma applications and/or cosmetic applications, or for cross-linking of rubber, in sheet moulding compounds, in bulk moulding compounds, in cross-linkable polyolefin system formulations, preferably for pipes and cables, in cross-linkable polyvinyl chloride, in unsaturated polyesters and in alkyd resins, and the use of the surface-treated calcium carbonate and a curing agent for crosslinking of cross-linkable compounds.

In practice, filler materials and especially calcium carbonate-containing filler materials are often used as particulate fillers in thermoplastic polymer products, such as fibres, filaments, films and/or threads, usually made of polyethylene (PE), polypropylene (PP), polyurethane (PU), polyvinylchloride (PVC), polyester (PES) and/or polyamide (PA). However, additives are introduced to provide the filler material with a coating and to improve the dispersability of said mineral filler material in the polymer composition as well as possibly to improve the processability of this polymer composition and/or properties of the final thermoplastic polymer products. An elimination of such additives would unacceptably reduce the resulting product quality. Furthermore, it is to be noted that such mineral filler materials are generally associated with the presence of volatiles evolving at temperatures reached during the application of such mineral fillers and/or in the processing of said polymer products comprising such mineral fillers.

In the art, several attempts have been made for producing such surface-treated calcium carbonate-containing materials. For instance, WO 00/20336 relates to an ultrafine natural calcium carbonate, which may optionally be treated with one or several fatty acids or one or several salts or mixtures thereof, and which is used as a rheology regulator for polymer compositions. EP 1 457 459 A1 refers to a surface-treated calcium carbonate which is surface-treated with an organic surface treating agent, said surface-treated calcium carbonate satisfies the particular BET specific surface area (Sw), reduced heat amount per unit specific surface area (As), average pore diameter (Dxp) at which an increased amount of mercury penetration reaches the maximum value in a method of mercury penetration, and amount of an average pore diameter [maximum value of an increased amount of mercury penetration (Dyp)/average pore diameter (Dxp)]. EP 1 548 070 A1 refers to a surface-treated calcium carbonate in which calcium carbonate is surface-treated with a fatty acid surface treatment agent satisfying the following equation (a), and the surface-treated calcium carbonate satisfying the following equation (b) is provided: (a) C12+ C14 85(%) and (b) Pv 90(%), C12 is a ratio of a fatty acid surface treatment agent having an alkyl group of 12 carbon atoms, C14 is a ratio of a fatty acid surface treatment agent having an alkyl group of 14 carbon atoms, and Pv is a ratio of a volume (vol. %) precipitated in hexane.

CN 103 896 776 A discloses a calcium carbonate surface modifier, and a preparation method and a use method thereof. Calcium carbonate particles processed by the calcium carbonate modifier can be filled to high-polarity polymers comprising polyvinyl chloride, polyacrylate and the like, and the surface polarity of the calcium carbonate particles is near to that of a matrix polymer, so the dispersion is good, and toughening and strengthening effects can be realized.

EP 0 804 429 A1 relates to alkene-substituted cyclic carboxylic acid anhydrides which are formed from the reaction product of a cyclic carboxylic acid anhydride, preferably succinic acid anhydride, and an olefin blend. The olefin blend is made up of internal linear and branched olefins and linear and/or branched alpha-olefins, in which blend the olefins contain 13-25 carbon atoms, and the internal and alpha-olefins are present at a ratio of 5-95% to 95-5%.

EP 0 172 693 A2 refers to a coated particulate filler to the surface of which there is bound an acid group-containing organic polymer which also comprises a nitrogen-containing group capable of reacting with an organic polymeric material. The acidic group may be a carboxylic acid group and the nitrogen-containing group may be an amide group or an amine group, especially an alkylamine or a polyakylamine derivative of an amine group.

EP 1 146 075 A1 refers to a method for producing surface-modified fillers by spray-drying an aqueous suspension of a filler that consists of fine particles, whereby 0.1 to 50 wt. % (calculated as dry substance) of an aqueous dispersion of a thermoplastic polymer or copolymer or a caoutchouc are added.

EP 1 731 574 A1 relates to a one package curable composition which comprises (A) an organic polymer having a silicon-containing group capable of cross-linking by forming a siloxane bond, (B) (b1) a carboxylic acid of which the carbon atom adjacent to a carbonyl group is a quaternary carbon, and/or (b2) a metal carboxylate of which the carbon atom adjacent to a carbonyl group is a quaternary carbon, and (C) a surface-treated ground calcium carbonate.

EP 2 011 766 A1 refers to a process for reducing the amount of organic components in water, wherein a surface-reacted natural calcium carbonate and a hydrophobic adsorbent, selected from the group consisting of talc, hydrophobised calcium carbonate, hydrophobised bentonite, hydrophobised kaolinite, hydrophobised glass, or any mixture thereof, are brought into contact with the water to be purified, the surface-reacted natural calcium carbonate being the reaction product of a natural calcium carbonate with an acid and carbon dioxide, which is formed in situ by the acid treatment and/or supplied externally, and the surface-reacted natural calcium carbonate being prepared as an aqueous suspension having a pH of greater than 6.0, measured at 20° C.

EP 2 722 368 A1 refers to a process for preparing a surface treated filler material product with succinic anhydride(s), a surface treated filler material product, a polymer composition, a fibre and/or filament and/or film and/or thread comprising the surface treated filler material product and/or the polymer composition, an article comprising the surface treated filler material product and/or the polymer composition and/or the fibre and/or filament and/or film and/or thread as well as the use of a mono-substituted succinic anhydride for decreasing the hydrophilicity of a calcium carbonate-containing filler material surface and the use of a surface-treated filler material product for initiating the cross-linking reaction in epoxide resins.

U.S. Pat. No. 4,322,336 refers to a filled/plasticized polymeric composition, e.g., a natural or synthetic rubber, the compatibility between reinforcing filler and plasticizer, particularly an oil, is achieved by incorporating therein a minor amount of an alkenyl succinimide.

US 2005/0137321 A1 refers to a silicone coating composition curable by polyaddition reactions, for improving the combing strength and the tear strength of a woven, knitted or nonwoven fibrous support, comprising mixture formed from: (a) at least one polyorganosiloxane (I) containing, per molecule, at least two C2-C6 alkenyl groups linked to silicon, (b) at least one polyorganosiloxane (II) containing, per molecule, at least two hydrogen atoms linked to silicon, (c) a catalytically effective amount of at least one catalyst (III), composed of at least one metal belonging to the platinum group, (d) at least one adhesion promoter (IV), (e) an additive system (B) for improving the combing strength and the tear strength, the constituents of which are added sequentially or simultaneously, comprising a mixture formed from: at least one polyorganosiloxane resin (V) present at up to 60% by weight relative to the total weight of the mixture and optionally mixed with at least one polyorganosiloxane serving as diluent, and calcium carbonate ($CaCO_3$) present at up to 19% by weight relative to the total weight of the mixture; (f) optionally, at least one curing inhibitor (VI), (h) optionally, at least one coloration additive (VII), and (i) optionally, at least one additive (VII) for improving the fire resistance.

US 2006/0047023 A1 relates to a process for treating an inorganic particulate to provide dispersibility in a thermoplastic, for example, titanium dioxide as an opacifier or colourant in a polyolefin concentrate, and for producing said pigmented thermoplastic, wherein a surface coating is applied to the particulate which comprises at least one alkenyl- or alkyl-substituted succinic anhydride.

US 2013/0280975 A1 concerns an aqueous flame retardant composition for mineral fibre-based mats, in particular glass or rock fibres, which comprises: at least one thermoplastic or thermoset resin, and at least one organic flame retarding agent chosen from: a) alkyl ketene dimers (AKDs) of formula (I) in which R1 and R2, which may be identical or different, represent a C4-C18, preferably C12-C16, alkyl radical; and b) alkenyl succinic anhydrides (ASAs) of formula (II) in which R3 and R4, which may be identical or different, represent an alkyl radical, the total number of carbon atoms in these radicals varying from 10 to 18, preferably from 12 to 14.

WO 97/37079 A1 refers to a size composition in the form of an aqueous emulsion or dispersion comprises hydrophobic cellulose-reactive particles, which exist as a physical mixture of at least two hydrophobic, cellulose-reactive sizing agents, comprising alkyl keten dimer (AKD) and alkenyl succinic acid anhydride (ASA) as well as starch and/or synthetic polymer.

WO 2011/042340 A1 relates to cross-linkable compositions, in particular compositions based on organosilicon compounds which can be stored in the absence of water and in the presence of water at room temperature are cross-linkable to form elastomers, containing (A) at least one cross-linkable compound and (B) a filler containing calcium carbonate (BO) surface-treated with carboxylic acids (C) of the formula $R^4$—(OC3 2-C(=O)OH)y (I).

However, it is not only important that the calcium carbonate material can be surface-treated in a cheap, simple and time-efficient manner but also that the obtained surface-treated calcium carbonate shows improved properties compared to the neat calcium carbonate material or to calcium carbonate materials prepared by another process. The surface properties, for example, hydrophobicity are the better the more of the surface area of the calcium carbonate is coated with the hydrophobic surface treatment agent. Furthermore, the attachment of the surface treatment agent has to be strong in order to avoid the detachment of the surface treatment agent in a subsequent treatment or processing step. However, by the processes of the prior art the surface treatment agents are attached very weakly to the surface of the calcium carbonate and thus these surface treatment agents can be washed-out to a large extent in a simple washing step which is typically implemented in such a process. Therefore, the surface-treated calcium carbonate may at least partially lose its hydrophobic character again. One may carry out the process without such a washing step such that the obtained surface-treated material is just dried after the surface-treatment step. However, if such an unwashed surface-treated material is then used in a product or process, the surface treatment agent may detach from the calcium carbonate surface and may be present in the product as "free" surface treatment agent which may negatively affect the product properties. Furthermore the effect of the surface treatment will be lost.

Thus, there is still a need for providing a process which addresses the foregoing technical problems described and especially allows for improving the surface characteristics of a resulting surface-treated calcium carbonate.

Accordingly, it is an objective of the present invention to provide a process for preparing a surface-treated calcium carbonate having improved surface characteristics, and especially a high hydrophobicity. A further objective is to provide a process for preparing a surface-treated calcium carbonate featuring a sufficient hydrophobicity for plastic applications. A still further objective is to provide a process for preparing a surface-treated calcium carbonate featuring a low moisture pick up susceptibility. Another objective of the present invention is to provide a process which can be carried out in a simple way. A further objective is that the process can be carried out under cost-efficient and mild conditions, i.e. by avoiding an intensive thermal treatment. Further objectives can be gathered from the following description of the invention.

The foregoing and other objectives are solved by the subject-matter as defined herein in claim 1.

According to one aspect of the present application a process for the surface treatment of a surface-modified calcium carbonate is provided. The process comprising the steps of:
  a) providing an aqueous suspension of at least one surface-modified calcium carbonate having solids content in the range from 5 to 80 wt.-%, based on the total weight of the aqueous suspension;
  b) adjusting the pH-value of the aqueous suspension of step a) to a range from 7.5 to 12;
  c) adding at least one surface treatment agent to the aqueous suspension obtained in step b) in an amount ranging from 0.05 to 10 mg surface treatment agent per $m^2$ of the surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;

d) mixing the aqueous suspension obtained in step c) at a temperature in the range from 30 to 120° C.; and e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate.

The inventors surprisingly found out that by the foregoing process it is possible to prepare surface-treated calcium carbonate materials having improved surface characteristics, especially a high hydrophobicity. Furthermore, by the process according to the present invention a surface-treated calcium carbonate material is provided, wherein the surface treatment agent is attached stronger to the calcium carbonate material compared to surface-treated calcium carbonate materials prepared by conventional processes, i.e. dry processes.

According to another aspect of the present invention, a surface-treated calcium carbonate obtained by the process is provided.

According to a further aspect of the present invention, a use of the surface-treated calcium carbonate in a polymer composition, in paper making, paper coatings, agricultural applications, paints, adhesives, sealants, construction applications, pharma applications and/or cosmetic applications is provided.

According to a still further aspect of the present invention, a use of the surface-treated calcium carbonate is provided, wherein the surface-treated calcium carbonate has been surface treated with at least one surface treatment agent being selected from the group consisting of mono- or di-substituted maleic anhydride containing compounds, fully or partially neutralized mono- or di-substituted succinic anhydride containing compounds, unsaturated fatty acids, salts of unsaturated fatty acids, unsaturated esters of phosphoric acid, salts of unsaturated phosphoric acid esters, abietic acid, salts of abietic acid and mixtures thereof, for cross-linking of rubber, in sheet moulding compounds, in bulk moulding compounds, in cross-linkable polyolefin system formulations, preferably for pipes and cables, in cross-linkable polyvinyl chloride, in unsaturated polyesters and in alkyd resins.

Advantageous embodiments of the present invention are defined in the corresponding sub-claims.

According to one embodiment the pH-value in step b) is adjusted by adding at least one base to the aqueous suspension of step a).

According to one embodiment of the present invention, the process comprises a further step f) of adding at least one base to the aqueous suspension of step c) to readjust the pH-value to the range from 7.5 to 12, preferably from 8 to 11.5 and most preferably from 8.5 to 11 during or after step d).

According to another embodiment of the present invention, the mono- or di-substituted succinic anhydride containing compounds, mono- or di-substituted succinic acid containing compounds or mono- or di-substituted succinic acid salts containing compounds comprise substituent(s) $R^1$ and/or $R^2$ comprising a cross-linkable double bond.

According to yet another embodiment of the present invention, the solids content of the aqueous suspension of step a) is in the range from 10 to 70 wt.-%, preferably in the range from 15 to 60 wt.-% and most preferably in the range from 15 to 40 wt.-%, based on the total weight of the aqueous suspension; and/or the specific surface area of the surface-modified calcium carbonate as measured by the BET nitrogen method is in the range from 20 to 250 $m^2/g$, preferably in the range from 25 to 200 $m^2/g$ and most preferably in the range from 35 to 150 $m^2/g$.

According to one embodiment of the present invention, the at least one base added in step b) is selected from the group consisting of calcium hydroxide, magnesium hydroxide, calcium hydrogen carbonate, sodium hydroxide, potassium hydroxide, lithium hydroxide, ammonium hydroxide, primary, secondary and tertiary amines and mixtures thereof, preferred is calcium hydroxide.

According to another embodiment of the present invention, the pH-value of the aqueous suspension of step a) is adjusted in process step b) to the range from 7.8 to 11.5 and more preferably to the range from 8 to 11.

According to yet another embodiment of the present invention, the amount of the at least one surface treatment agent added in step c) is in the range from 0.07 to 9 mg surface treatment agent per $m^2$ of the surface area of the surface-modified calcium carbonate, preferably in the range from 0.1 to 8 mg surface treatment agent per $m^2$ of the surface area of the surface-modified calcium carbonate and most preferably in the range from 0.11 to 5 mg surface treatment agent per $m^2$ of the surface area of the surface-modified calcium carbonate.

According to one embodiment of the present invention, the at least one surface treatment agent is a) selected from the group consisting of sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) maleinized polybutadiene having a Brookfield viscosity at 25° C. in the range from 1 000 to 300 000 mPa·s, and/or an acid number in the range from 10 to 300 mg potassium hydroxide per g maleinized polybutadiene and/or an iodine number in the range from 100 to 1 000 g iodine per 100 g maleinized polybutadiene; and/or c) polyisobutylene succinic anhydride having a Brookfield viscosity at 25° C. in the range from 1 000 to 300 000 mPa·s and/or an acid number in the range from 10 to 80 mg potassium hydroxide per g polyisobutylene succinic anhydride.

According to another embodiment of the present invention, step d) is carried out at a temperature in the range from 45 to 115° C., preferably from 50 to 105° C. and more preferably in the range from 80 to 100° C. and/or for a period of time ranging from 1 second to 60 minutes.

According to yet another embodiment of the present invention, step e) is carried out until the moisture content of the obtained surface-treated calcium carbonate is in the range from 0.005 to 15 wt.-%, preferably in the range from 0.01 to 10 wt.-% and more preferably from 0.05 to 5 wt.-%, based on the total weight of the surface-treated calcium carbonate.

According to one embodiment of the present invention, step e) is carried out at a temperature in the range from 50 to 155° C., preferably from 70 to 150° C. and more preferably from 80 to 145° C.

According to another embodiment of the present invention, the at least one base added in step f) is selected from the group consisting of lithium hydroxide, sodium hydroxide, potassium hydroxide, calcium hydroxide, magnesium hydroxide and/or mixtures thereof.

According to yet another embodiment of the present invention, the process comprises a further step g) after or during step e) of deagglomerating the surface-treated calcium carbonate of step d) or e), preferably step g) is carried out during step e).

According to one embodiment of the present invention, all process steps are fully or partially batch or continuous processes, wherein a batch process is preferred for steps a) to d) and f) and a continuous process is preferred for step e).

It should be understood that for the purposes of the present invention, the following terms have the following meanings:

The term "surface-treated calcium carbonate" in the meaning of the present invention refers to a surface-modified calcium carbonate which has been contacted with a surface treatment agent such as to obtain a treatment layer on at least a part of the surface of the surface-modified calcium carbonate.

A "surface-modified calcium carbonate" according to the present invention is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. A $H_3O^+$ ion donor in the context of the present invention is a Brønsted acid and/or an acid salt.

A "treatment layer" in the gist of the present invention refers to a layer, preferably a monolayer of a surface treatment agent on the surface of the at least one surface-modified carbonate. The "treatment layer" essentially consists of a treatment agent selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof, and/or reaction products thereof.

The term "essentially" in the meaning of the present invention refers to a treatment layer that contains compounds differing from the treatment agent selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof, and/or reaction products thereof in an amount of <5 wt.-%, preferably <2 wt.-% and most preferably <1 wt.-%, based on the total weight of the treatment layer.

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 µm pore size at 20° C. to recover the liquid filtrate, provide more than 0.1 g of recovered solid material following evaporation at 95 to 100° C. of 100 g of said liquid filtrate at ambient pressure.

The term "base" according to the present invention refers to a base as defined by the Brønsted-Lowry theory. Therefore, a base in the meaning of the present invention is a substance that can accept hydrogen ions ($H^+$)—otherwise known as protons.

The term "surface treatment agent" according to the present invention is an agent that is used to treat the surface of the at least one surface-modified calcium carbonate.

The term "surface area" in the meaning of the present invention refers to the BET surface area of the surface-modified calcium carbonate particles as measured via the BET method according to ISO 9277:2010 using nitrogen.

The term "dry" or "dried" material is understood to be a material having between 0.001 to 20 wt.-% of water, based on the total weight of the surface-treated calcium carbonate. The % water (equal to "moisture content") is determined gravimetrically. "Drying" in the sense of the present invention means that heating is carried out until the moisture content of the surface-treated calcium carbonate is in the range from 0.001 to 20% by weight, based on the total weight of the surface-treated calcium carbonate.

The "hydrophobicity" of the surface-treated calcium carbonate is evaluated at +23° C. (±2° C.) by determining the minimum water to ethanol ratio in a volume/volume based water/ethanol-mixture needed for the settling 50 wt.-% of said surface-treated calcium carbonate, where said material is deposited on the surface of said water ethanol-mixture by passage through a house hold tea sieve. The volume/volume base is related to the volumes of both separate liquids before blending them together and do not include the volume contraction of the blend.

The term "solid" according to the present invention refers to a material that is solid under standard ambient temperature and pressure (SATP) which refers to a temperature of 298.15 K (25° C.) and an absolute pressure of exactly 100 000 Pa (1 bar, 14.5 psi, 0.98692 atm). The solid may be in the form of a powder, tablet, granules, flakes etc.

The term "liquid" according to the present invention refers to a material that is liquid under standard ambient temperature and pressure (SATP) which refers to a temperature of 298.15 K (25° C.) and an absolute pressure of exactly 100 000 Pa (1 bar, 14.5 psi, 0.98692 atm). It is to be noted that the liquid may be a neat liquid or a solution which further comprises a solvent, preferably water. The liquid may also comprise insoluble solids and thus may form a suspension or dispersion.

The term "gas" according to the present invention refers to a material that is gaseous under standard ambient temperature and pressure (SATP) which refers to a temperature of 298.15 K (25° C.) and an absolute pressure of exactly 100 000 Pa (1 bar, 14.5 psi, 0.98692 atm).

The term "ambient pressure" according to the present invention refers to the standard ambient temperature pressure (SATP) which refers to an absolute pressure of exactly 100 000 Pa (1 bar, 14.5 psi, 0.98692 atm). The term "reduced pressure" refers to a pressure below the "ambient pressure".

Where the term "comprising" is used in the present description and claims, it does not exclude other nonspecified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As set out above, the inventive process for preparing a surface-treated (surface-modified) calcium carbonate comprises at least the process steps of a), b), c), d) and e). In the following, it is referred to further details of the present invention and especially the foregoing steps of the inventive process for preparing a surface-treated (surface-modified) calcium carbonate.

Characterization of Step a): Provision of at Least One Surface-Modified Calcium Carbonate According to step a) of the process of the present invention, an aqueous suspension of at least one surface-modified calcium carbonate having solids content in the range from 5 to 80 wt.-%, based on the total weight of the aqueous suspension is provided.

The term "at least one" surface-modified calcium carbonate in the meaning of the present invention means that the surface-modified calcium carbonate comprises, preferably consists of, one or more surface-modified calcium carbonate(s).

In one embodiment of the present invention, the at least one surface-modified calcium carbonate comprises, preferably consists of, one surface-modified calcium carbonate. Alternatively, the at least one surface-modified calcium carbonate comprises, preferably consists of, two or more surface-modified calcium carbonates. For example, the at least one surface-modified calcium carbonate comprises, preferably consists of, two or three surface-modified calcium carbonates.

Preferably, the at least one surface-modified calcium carbonate comprises, more preferably consists of, one surface-modified calcium carbonate.

The surface-modified calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

A $H_3O^+$ ion donor in the context of the present invention is a Brønsted acid and/or an acid salt.

In a preferred embodiment of the invention the surface-modified calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step a), and (c) treating the suspension of step (a) with carbon dioxide before, during or after step (b). According to another embodiment the surface-modified calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 µm, preferably 0.2 to 5.0 µm, more preferably 0.4 to 3.0 µm, most preferably 0.6 to 1.2 µm, especially 0.7 µm. According to a further embodiment of the present invention, the natural or precipitated calcium carbonate is in form of particles having a top cut particle size $d_{98}$ of 0.15 to 55 µm, preferably 1 to 40 µm, more preferably 2 to 25 µm, most preferably 3 to 15 µm, especially 4 µm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^n$ $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H-_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-modified natural or precipitated calcium carbonate as an aqueous suspension having a pH of greater than 6.0, preferably greater than 6.5, more preferably greater than 7.0, even more preferably greater than 7.5.

Further details about the preparation of the surface-modified natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-modified precipitated calcium carbonate is obtained. As can be taken in detail from WO 2009/074492 A1, surface-modified precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-modified precipitated calcium carbonate, wherein said surface-modified precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-modified natural or precipitated calcium carbonate, the natural or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-modified natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-modified calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface reacted calcium carbonate may have different particle shapes, such as e.g. the shape of roses, golf balls and/or brains.

In a preferred embodiment, the surface-modified calcium carbonate has a specific surface area of from 20 $m^2/g$ to 250 $m^2/g$, preferably from 25 $m^2/g$ to 200 $m^2/g$, more preferably from 30 $m^2/g$ to 160 $m^2/g$, even more preferably from 35 $m^2/g$ to 150 $m^2/g$, and most preferably from 35 $m^2/g$ to 145 $m^2/g$, measured using nitrogen and the BET method. For example, the surface-modified calcium carbonate has a specific surface area of from 35 $m^2/g$ to 50 $m^2/g$ or from 125 $m^2/g$ to 145 $m^2/g$, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) using nitrogen gas and is specified in $m^2/g$.

It is furthermore preferred that the surface-modified calcium carbonate particles have a volume median grain diameter $d_{50}$ (vol) of from 1 to 75 µm, preferably from 2 to 50 µm, more preferably 3 to 40 µm, even more preferably from 4 to 30 µm, and most preferably from 5 to 15 µm.

It may furthermore be preferred that the surface-modified calcium carbonate particles have a grain diameter $d_{98}$ (vol) of from 2 to 150 µm, preferably from 4 to 100 µm, more preferably 6 to 80 µm, even more preferably from 8 to 60 µm, and most preferably from 10 to 30 µm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt.) value is thus the weight median particle size, i.e. 50 wt.-% of all grains are smaller than this particle size, and the $d_{50}$ (vol.) value is the volume median particle size, i.e. 50 vol.-% of all grains are smaller than this particle size.

Volume median grain diameter $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine grain size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 µm (~nm). The equilibration time used at each pressure step is 20 seconds. The sample material is sealed in a 5 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-modified calcium carbonate has an intra-particle intruded specific pore volume in the range from 0.1 to 2.3 cm³/g, more preferably from 0.2 to 2.0 cm³/g, especially preferably from 0.4 to 1.8 cm³/g and most preferably from 0.6 to 1.6 cm³/g, calculated from mercury porosimetry measurement.

The intraparticle pore size of the surface-modified calcium carbonate preferably is in a range of from 0.004 to 1.6 µm, more preferably in a range of from 0.005 to 1.3 µm, especially preferably from 0.006 to 1.15 µm and most preferably of 0.007 to 1.0 µm, e.g. 0.01 to 0.9 µm determined by mercury porosimetry measurement.

The inventors surprisingly found out that the surface treatment agent attaches stronger to the surface-modified calcium carbonate particle surface if the surface treatment is carried out wet, i.e. the surface treatment is carried out in the presence of an aqueous solvent, preferably water.

Thus, it is one requirement of the present invention that the at least one surface-modified calcium carbonate is provided in form of an aqueous suspension having a solids content in the range from 5 to 80 wt.-%, based on the total weight of the aqueous suspension. According to a preferred embodiment the solids content of the aqueous suspension is in the range from 10 to 70 wt.-%, more preferably in the range from 15 to 60 wt.-% and most preferably in the range from 15 to 40 wt.-%, based on the total weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

According to a preferred embodiment the aqueous suspension consists of water and the at least one surface-modified calcium carbonate.

Alternatively, the aqueous surface-modified calcium carbonate suspension comprises further additives.

Additionally or alternatively, the aqueous surface-modified calcium carbonate suspension comprises a dispersing agent, e.g. a polyacrylate.

Characterization of Step b): Adjusting the pH-Value

According to step b) of the process of the present invention, the pH-value of the aqueous suspension of step a) is adjusted to a range from 7.5 to 12.

One option for adjusting the pH-value to the desired range is to use a basic starting material for manufacturing the at least one surface-modified calcium carbonate. Another preferred option according to step b) of the process of the present invention is the addition of at least one base to the aqueous suspension of step a) for adjusting the pH-value to a range from 7.5 to 12.

The inventors surprisingly found that by adjusting the pH-value of the aqueous suspension of step a) to a range from 7.5 to 12, the surface treatment agent according to present invention is attached stronger to the surface of the surface-modified calcium carbonate than without such a pH-value adjustment and/or outside that pH-range and thus improves the hydrophobicity of the obtained surface-treated calcium carbonate.

Preferably, the pH-value is adjusted in process step b) by adding at least one base to the aqueous suspension of step a).

The term "at least one" base in the meaning of the present invention means that the base comprises, preferably consists of, one or more base(s).

In one embodiment of the present invention, the at least one base comprises, preferably consists of, one base. Alternatively, the at least one base comprises, preferably consists of, two or more bases. For example, the at least one base comprises, preferably consists of, two or three bases.

Preferably, the at least one base comprises, more preferably consists of, one base.

The at least one base is not restricted to a specific base as long as it is suitable for adjusting the pH-value of the aqueous suspension of step a) to a range from 7.5 to 12.

The at least one base added in step b) is preferably selected from the group consisting of calcium hydroxide, magnesium hydroxide, calcium hydrogen carbonate, sodium hydroxide, potassium hydroxide, lithium hydroxide, ammonium hydroxide, primary, secondary and tertiary amines and mixtures thereof. For example, the at least one base is selected from the group consisting of calcium hydroxide, sodium hydroxide, potassium hydroxide, lithium hydroxide, ammonium hydroxide and mixtures thereof. Preferably, the at least one base is calcium hydroxide and/or sodium hydroxide and/or ammonium hydroxide. Most preferably, the at least one base is calcium hydroxide. Calcium hydroxide is advantageously added as it does not impart foreign cation impurities to the aqueous suspension of surface-modified calcium carbonate.

Primary, secondary or tertiary amines in the meaning of the present invention are derivatives of ammonia, wherein one or more hydrogen atoms have been replaced by a substituent such as an alkyl or aryl group.

The base may be used in "solid" form or in "liquid" form or as "gas".

For example, calcium hydroxide, magnesium hydroxide, calcium hydrogen carbonate, sodium hydroxide, potassium hydroxide and lithium hydroxide are solid under standard ambient temperature and pressure (SATP) which refers to a temperature of 298.15 K (25° C.) and an absolute pressure of exactly 100 000 Pa (1 bar, 14.5 psi, 0.98692 atm). If the at least one base is in solid form it can be added to the aqueous suspension of step a) for example as powder, tablet, granules, flakes etc.

However, the solid base may also be dissolved/dispersed/suspended in water and added as solution or suspension or dispersion to the aqueous suspension of step a), i.e. as a liquid, preferably by using water as solvent.

For example, ammonium hydroxide according to the present invention is a solution of ammonia ($NH_3$) in water and, therefore, ammonium hydroxide is used as liquid. Furthermore, several primary, secondary or tertiary amines, for example, propylamine, diethylamine and triethylamine are liquid under standard ambient temperature and pressure (SATP) which refers to a temperature of 298.15 K (25° C.) and an absolute pressure of exactly 100 000 Pa (1 bar, 14.5 psi, 0.98692 atm). If the at least one base is in liquid form it can be added to the aqueous suspension of step a) for example as neat liquid or as solution wherein the liquid base is mixed with water.

Some primary, secondary or tertiary amines like, for example, methylamine, ethylamine, dimethylamine and triethylamine are gases under standard ambient temperature and pressure (SATP) which refers to a temperature of 298.15 K (25° C.) and an absolute pressure of exactly 100 000 Pa (1 bar, 14.5 psi, 0.98692 atm). If the at least one base is in gaseous form it may be bubbled through the aqueous suspension of step a).

The addition of the at least one base to the aqueous suspension of step a) can be accomplished by any conventional means known to the skilled person. Preferably, the addition may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

As already mentioned above, it is one requirement of the present invention that the pH-value of the aqueous suspension of step a) is adjusted to a range from 7.5 to 12, preferably by adding the at least one base.

According to one embodiment, the pH-value of the aqueous suspension of step a) is adjusted in process step b) to the range from 7.8 to 11.5 and more preferably to the range from 8 to 11.

The pH adjustment of the present invention can be measured with any pH meter that may be used for measuring the pH in suspension, for example, a Mettler Toledo Seven Easy pH meter with a Mettler Toledo InLab® Expert Pro pH electrode. The pH is measured at 25° C. and the pH is stable according to the present invention when there is no change in the pH value within +/−0.2 units for 5 minutes.

Preferably, process step b) is carried out at a temperature of from 15 to 40° C., preferably of from 20 to 30° C., and most preferably of about 25° C.

According to one embodiment, the aqueous suspension obtained in step b) is preheated, before step c) is carried out. That is to say, the aqueous suspension obtained in step b) comprising the base of step b) and the aqueous suspension of the at least one surface-modified calcium carbonate is preheated at a temperature of from 30 to 120° C., preferably of from 45 to 115° C., more preferably of from 50 to 105° C. and most preferably of from 80 to 100° C. before step c) is carried out. For example, the aqueous suspension obtained in step b) is preheated to a temperature of 90° C.±5° C.

The treatment time for carrying out the preheating of the aqueous suspension obtained from step b) is carried out for a period of 30 min or less, preferably for a period of 20 min or less and most preferably for a period of 15 min or less, e.g. 1 second to 15 min.

According to one embodiment of the present invention the aqueous suspension obtained from step b) is preheated to a temperature of from 30 to 120° C., preferably of from 45 to 115° C., more preferably of from 50 to 105° C. and most preferably of from 80 to 100° C. before step c) is carried out for a period of 30 min or less, preferably for a period of 20 min or less and more preferably for a period of 15 min or less, e.g. 1 second to 15 min.

In one embodiment of the present invention, the preheating of the aqueous suspension obtained from step b) is carried out at a temperature that is about equal to the temperature implemented during mixing step d).

The term "equal" temperature in the meaning of the present invention refers to a preheating temperature that is at most 20° C., preferably at most 15° C., more preferably 10° C. and most preferably at most 5° C., below or above the temperature implemented during mixing step d).

The preheating of the aqueous suspension obtained from step b) takes place under mixing conditions. The skilled man will adapt these mixing conditions (such as the configuration of mixing pallets and mixing speed) according to his process equipment.

Characterization of Step c): Addition of at Least One Surface Treatment Agent

According to step c) of the present invention, at least one surface treatment agent is added to the aqueous suspension obtained in step b) in an amount ranging from 0.05 to 10 mg surface treatment agent per m² of the accessible surface area of the at least one surface-modified calcium carbonate as provided in step a). The at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof.

The term "at least one" surface treatment agent in the meaning of the present invention means that the surface treatment agent comprises, preferably consists of, one or more surface treatment agent(s).

In one embodiment of the present invention, the at least one surface treatment agent comprises, preferably consists of, one surface treatment agent. Alternatively, the at least one surface treatment agent comprises, preferably consists of, two or more surface treatment agents. For example, the at least one surface treatment agent comprises, preferably consists of, two or three surface treatment agents.

Preferably, the at least one surface treatment agent comprises, more preferably consists of, one surface treatment agent.

The at least one surface treatment agent can be a mono- or di-substituted succinic anhydride containing compound and/or a mono- or di-substituted succinic acid containing compound and/or a mono- or di-substituted succinic acid salt containing compound.

The term "succinic anhydride containing compound" refers to a compound containing succinic anhydride. The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride containing compound in the meaning of the present invention refers to a succinic anhydride wherein a hydrogen atom is substituted by another substituent.

The term "di-substituted" succinic anhydride containing compound in the meaning of the present invention refers to a succinic anhydride wherein two hydrogen atoms are substituted by another substituent.

The term "succinic acid containing compound" refers to a compound containing succinic acid. The term "succinic acid" has the molecular formula $C_4H_6O_4$.

The term "mono-substituted" succinic acid in the meaning of the present invention refers to a succinic acid wherein a hydrogen atom is substituted by another substituent.

The term "di-substituted" succinic acid containing compound in the meaning of the present invention refers to a succinic acid wherein two hydrogen atoms are substituted by another substituent.

The term "succinic acid salt containing compound" refers to a compound containing succinic acid, wherein the active acid groups are partially or completely neutralized. The term "partially neutralized" succinic acid salt containing compound refers to a degree of neutralization of the active acid groups in the range from 40 and 95 mole-%, preferably from 50 to 95 mole-%, more preferably from 60 to 95% and most preferably from 70 to 95%. The term "completely neutralized" succinic acid salt containing compound refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The succinic acid salt containing compound is preferably a compound selected from the group consisting of sodium, potassium, calcium, magnesium, lithium, strontium, primary amine, secondary amine, tertiary amine and/or ammonium salts thereof, whereby the amine salts are linear or cyclic. It is appreciated that one or both acid groups can be in the salt form, preferably both acid groups are in the salt form.

The term "mono-substituted" succinic acid salt in the meaning of the present invention refers to a succinic acid salt wherein a hydrogen atom is substituted by another substituent.

The term "di-substituted" succinic acid containing compound in the meaning of the present invention refers to a succinic acid salt wherein two hydrogen atoms are substituted by another substituent.

Accordingly, the mono- or di-substituted succinic anhydride containing compounds, mono- or di-substituted succinic acid containing compounds or mono- or di-substituted succinic acid salts containing compounds comprise substituent(s) $R^1$ and/or $R^2$.

It is appreciated that surface treatment agent located on the surface of the surface-treated calcium carbonate are suitable for undergoing a reaction with a material surrounding the surface-treated calcium carbonate. Thus, it is preferred that the mono- or di-substituted succinic anhydride containing compounds, mono- or di-substituted succinic acid containing compounds or mono- or di-substituted succinic acid salts containing compounds comprise substituent(s) $R^1$ and/or $R^2$ comprising a cross-linkable double bond.

The cross-linkable double bond is located terminally and/or in a side chain of substituent(s) $R^1$ and/or $R^2$.

The substituent(s) $R^1$ and/or $R^2$ comprising a cross-linkable double bond is/are preferably selected from an isobutylene, a polyisobutylene, an acryloyl, a methacryloyl group or mixtures thereof.

For example, the surface treatment agent is a polyisobutylene succinic anhydride having a Brookfield viscosity at 25° C. in the range from 1 000 to 300 000 mPa·s. Additionally or alternatively, the surface treatment agent is a polyisobutylene succinic anhydride having an acid number in the range from 10 to 80 mg potassium hydroxide per g polyisobutylene succinic anhydride.

Preferably, the surface treatment agent is a polyisobutylene succinic anhydride having a Brookfield viscosity at 25° C. in the range from 1 000 to 300 000 mPa·s and an acid number in the range from 10 to 80 mg potassium hydroxide per g polyisobutylene succinic anhydride.

In one embodiment, the surface treatment agent is a maleinized polybutadiene having a Brookfield viscosity at 25° C. in the range from 1 000 to 300 000 mPa·s, and/or an acid number in the range from 10 to 300 mg potassium hydroxide per g maleinized polybutadiene and/or an iodine number in the range from 100 to 1 000 g iodine per 100 g maleinized polybutadiene. For example, the surface treatment agent is a maleinized polybutadiene having a Brookfield viscosity at 25° C. in the range from 1 000 to 300 000 mPa·s, or an acid number in the range from 10 to 300 mg potassium hydroxide per g maleinized polybutadiene or an iodine number in the range from 100 to 1 000 g iodine per 100 g maleinized polybutadiene. Alternatively, the surface treatment agent is a maleinized polybutadiene having a Brookfield viscosity at 25° C. in the range from 1 000 to 300 000 mPa·s, and an acid number in the range from 10 to 300 mg potassium hydroxide per g maleinized polybutadiene and an iodine number in the range from 100 to 1 000 g iodine per 100 g maleinized polybutadiene.

The term "maleinized" means that the succinic anhydride is obtained after reaction of substituent(s) $R^1$ and/or $R^2$ comprising a cross-linkable double bond with the double bond of maleic anhydride.

It is preferred that the mono- or di-substituted succinic anhydride containing compounds, mono- or di-substituted succinic acid containing compounds or mono- or di-substituted succinic acid salts containing compounds comprises substituent $R^1$ only. Accordingly, said compound is preferably a mono-substituted succinic anhydride containing compound, mono-substituted succinic acid containing compound or mono-substituted succinic acid salt containing compound comprising substituent $R^1$.

Additionally or alternatively, the at least one surface treatment agent is selected from unsaturated fatty acids and/or salts of unsaturated fatty acids.

The term "unsaturated fatty acid" in the meaning of the present invention refers to straight chain or branched chain, unsaturated organic compounds composed of carbon and hydrogen. Said organic compound further contains a carboxyl group placed at the end of the carbon skeleton.

The unsaturated fatty acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the surface treatment agent being an unsaturated fatty acid is selected from the group consisting of myristoleic acid, palmitoleic acid, sapienic acid, oleic acid, elaidic acid, vaccenic acid, linoleic acid, α-linolenic acid and mixtures thereof. Most preferably, the surface treatment agent being an unsaturated fatty acid is oleic acid and/or linoleic acid, preferably oleic acid or linoleic acid, most preferably linoleic acid.

Additionally or alternatively, the surface treatment agent is a salt of an unsaturated fatty acid.

The term "salt of unsaturated fatty acid" refers to an unsaturated fatty acid, wherein the active acid group is partially or completely neutralized. The term "partially neutralized" unsaturated fatty acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" unsaturated fatty acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of unsaturated fatty acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the surface treatment agent is a salt of oleic acid and/or linoleic acid, preferably oleic acid or linoleic acid, most preferably linoleic acid.

Additionally or alternatively, the at least one surface treatment agent is an unsaturated ester of phosphoric acid and/or a salt of an unsaturated phosphoric acid ester.

Thus, the unsaturated ester of phosphoric acid may be a blend of one or more phosphoric acid mono-ester and one or more phosphoric acid di-ester and optionally one or more phosphoric acid tri-ester. In one embodiment, said blend further comprises phosphoric acid.

For example, the unsaturated ester of phosphoric acid is a blend of one or more phosphoric acid mono-ester and one or more phosphoric acid di-ester. Alternatively, the unsaturated ester of phosphoric acid is a blend of one or more phosphoric acid mono-ester and one or more phosphoric acid di-ester and phosphoric acid. Alternatively, the unsaturated ester of phosphoric acid is a blend of one or more phosphoric acid mono-ester and one or more phosphoric acid di-ester and one or more phosphoric acid tri-ester. Alternatively, the unsaturated ester of phosphoric acid is a blend of one or more phosphoric acid mono-ester and one or more phosphoric acid di-ester and one or more phosphoric acid tri-ester and phosphoric acid.

For example, said blend comprises phosphoric acid in an amount of <8 mol.-%, preferably of <6 mol.-%, and more preferably of <4 mol.-%, like from 0.1 to 4 mol.-%, based on the molar sum of the compounds in the blend.

The term "phosphoric acid mono-ester" in the meaning of the present invention refers to an o-phosphoric acid molecule mono-esterified with one alcohol molecule selected from unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid tri-ester" in the meaning of the present invention refers to an o-phosphoric acid molecule tri-esterified with three alcohol molecules selected from the same or different, unsaturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

Additionally or alternatively, the surface treatment agent is a salt of an unsaturated phosphoric acid ester. In one embodiment, the salt of an unsaturated phosphoric acid ester may further comprise minor amounts of a salt of phosphoric acid.

The term "salt of unsaturated phosphoric acid ester" refers to an unsaturated phosphoric acid ester, wherein the active acid group(s) is/are partially or completely neutralized. The term "partially neutralized" unsaturated phosphoric acid esters refers to a degree of neutralization of the active acid group(s) in the range from 40 and 95 mole-%, preferably from 50 to 95 mole-%, more preferably from 60 to 95 mole-% and most preferably from 70 to 95 mole-%. The term "completely neutralized" unsaturated phosphoric acid esters refers to a degree of neutralization of the active acid group(s) of >95 mole-%, preferably of >99 mole-%, more preferably of >99.8 mole-% and most preferably of 100 mole-%. Preferably, the active acid group(s) is/are partially or completely neutralized.

The salt of unsaturated phosphoric acid ester is preferably a compound selected from the group consisting of sodium, potassium, calcium, magnesium, lithium, strontium, primary amine, secondary amine, tertiary amine and/or ammonium salts thereof, whereby the amine salts are linear or cyclic.

Additionally or alternatively, the at least one surface treatment agent is abietic acid (also named: abieta-7,13-dien-18-oic acid).

Additionally or alternatively, the surface treatment agent is a salt of abietic acid.

The term "salt of abietic acid" refers to abietic acid, wherein the active acid groups are partially or completely neutralized. The term "partially neutralized" abietic acid refers to a degree of neutralization of the active acid groups in the range from 40 and 95 mole-%, mol % preferably from 50 to 95 mole-%, more preferably from 60 to 95 mole-% and most preferably from 70 to 95 mole-%. The term "completely neutralized" abietic acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized, more preferably completely neutralized.

The salt of abietic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic.

It is required that the at least one surface treatment agent is added to the aqueous suspension obtained in step b) in an amount ranging from 0.05 to 10 mg surface treatment agent per $m^2$ of the accessible surface area of the surface-modified calcium carbonate as provided in step a).

According to one embodiment of the present invention the amount of the at least one surface treatment agent added in step c) is in the range from 0.07 to 9 mg surface treatment agent per $m^2$ of the accessible surface area of the calcium carbonate, preferably in the range from 0.1 to 8 mg surface treatment agent per $m^2$ of the accessible surface area of the calcium carbonate and most preferably in the range from 0.11 to 5 mg surface treatment agent per $m^2$ of the accessible surface area of the calcium carbonate.

The step of adding the at least one surface treatment agent, in one or more steps, to the aqueous suspension obtained in step b) preferably takes place under mixing conditions. The skilled man will adapt these mixing conditions (such as the configuration of mixing pallets and mixing speed) according to his process equipment.

In one embodiment of the present invention, the process may be a continuous process. In this case, it is possible to add the at least one surface treatment agent to the aqueous suspension obtained in step b) in a constant flow such that a constant concentration of the at least one surface treatment agent is provided during step c).

Alternatively, the at least one surface treatment agent is added to the aqueous suspension obtained in step b) in one step, wherein said at least one surface treatment agent is preferably added in one portion.

In another embodiment, the inventive process may be a batch process, i.e. the at least one surface treatment agent is added to the aqueous suspension obtained in step b) in more than one step, wherein said at least one surface treatment agent is preferably added in about equal portions. Alternatively, it is also possible to add the at least one surface-treatment agent in unequal portions to the aqueous suspension obtained in step b), i.e. in larger and smaller portions.

According to one embodiment of the present invention, step c) is carried out in a batch or continuous process for a period of time from 0.1 to 1 000 s. For example, step c) is a continuous process and comprises one or several contacting steps and the total contacting time is from 0.1 to 20 s, preferably from 0.5 to 15 s and most preferably from 1 to 10 s.

The surface-treatment agent may be used in "solid" form or as "liquid".

However, the solid surface treatment agent may also be dissolved/dispersed/suspended in a solvent and added as solution or suspension or dispersion to the aqueous suspension obtained in step b), i.e. as a liquid.

The solvent that may be used to dilute/dissolve/disperse/suspend the surface treatment agent may be water and/or an organic solvent that is miscible with water, for example, an organic solvent like ethanol, methanol, acetone, ethylene glycol, glycerine or propanol. According to a preferred embodiment the solvent consists of water. According to another preferred embodiment the solvent is a mixture of water and at least one organic solvent that is miscible with water. Preferably, the solvent is a mixture consisting of water and ethanol and more preferably the water:ethanol mixture has a ratio from 2:1 to 1:2, based on the weight of the solvents and most preferably the water:ethanol mixture has a ratio of 1:1, based on the weight of the solvents.

According to one embodiment of the present invention the solids content of the diluted/dissolved/dispersed solution/suspension/dispersion comprising the solvent and the at least one surface treatment agent is in the range from 0.1 to 15 wt.-%, preferably in the range from 1 to 10 wt.-%, more preferably in the range from 1.5 to 8 wt.-%, and most preferably in the range from 2 to 6 wt.-%, based on the total weight of the suspension/solution/dispersion.

According to another embodiment of the present invention the at least one surface treatment agent or the diluted/dissolved/dispersed solution/suspension/dispersion comprising the solvent and the at least one surface treatment agent is preheated, before addition step c) is carried out. That is to say, the at least one surface treatment agent or the diluted/dissolved/dispersed solution/suspension/dispersion comprising the solvent and the at least one surface treatment agent is treated at a temperature of from 30 to 120° C., preferably of from 45 to 115° C., more preferably of from 50 to 105° C. and most preferably of from 80 to 100° C. before addition step c) is carried out.

The treatment time for carrying out the preheating of the at least one surface treatment agent or the diluted/dissolved/dispersed solution/suspension/dispersion comprising the solvent and the at least one surface treatment agent is carried out for a period of 30 min or less, preferably for a period of 20 min or less and more preferably for a period of 15 min or less.

According to another embodiment of the present invention the at least one surface treatment agent or the diluted/dissolved/dispersed solution/suspension/dispersion comprising the solvent and the at least one surface treatment agent is preheated at a temperature of from 30 to 120° C., preferably of from 45 to 115° C., more preferably of from 50 to 105° C. and most preferably of from 80 to 100° C. before addition step c) is carried out for a period of 30 min or less, preferably for a period of 20 min or less and more preferably for a period of 15 min or less.

In one embodiment of the present invention, the preheating of the at least one surface treatment agent or the diluted/dissolved/dispersed solution/suspension/dispersion comprising the solvent and the at least one surface treatment agent is carried out at a temperature that is of about equal to the temperature implemented during mixing step d).

The term "equal" temperature in the meaning of the present invention refers to a preheating temperature that is at most 20° C., preferably at most 15° C., more preferably 10° C. and most preferably at most 5° C., below or above the temperature implemented during mixing step d).

The preheating of the at least one surface treatment agent or the diluted/dissolved/dispersed solution/suspension/dispersion comprising the solvent and the at least one surface treatment agent preferably takes place under mixing conditions. The skilled man will adapt these mixing conditions (such as the configuration of mixing pallets and mixing speed) according to his process equipment.

According to a preferred embodiment of the present invention, the at least one surface treatment agent, i.e. the mono- or di-substituted succinic acid containing compounds, unsaturated fatty acids, unsaturated esters of phosphoric acid, salts of unsaturated phosphoric acid esters; abietic acid, salts of abietic acid and mixtures thereof, or the diluted/dissolved/dispersed solution/suspension comprising the solvent and the at least one surface treatment agent may be treated with a base before the addition step c) in order to obtain the corresponding salt thereof.

The base may be selected from potassium hydroxide, lithium hydroxide, ammonium hydroxide and/or sodium hydroxide, and preferably is sodium hydroxide.

The addition of the at least one base to the surface treatment agent can be accomplished by any conventional means known to the skilled person. Preferably, the addition may be carried out under mixing conditions. The skilled person will adapt these mixing conditions such as the mixing speed and temperature according to his process equipment.

The base may be added to the surface treatment agent, i.e. the mono- or di-substituted succinic acid containing compounds, unsaturated fatty acids, unsaturated esters of phosphoric acid, salts of unsaturated phosphoric acid esters; abietic acid, and mixtures thereof, in an amount ranging of 0.1 to 15 wt.-%, preferably in the range of 1 to 10 wt.-%, more preferably in the range of 1.5 to 8 wt.-%, and most preferably in the range of 2 to 6 wt.-%, based on the dry weight of the surface treatment agent.

Characterization of Step d): Mixing of the Aqueous Suspension Obtained in Step c)

According to step d) of the present invention the aqueous suspension obtained in step c) is mixed at a temperature in the range from 30 to 120° C.

The mixing of the aqueous suspension obtained in step c) can be accomplished by any conventional means known to the skilled person. The skilled person will adapt the mixing conditions such as the mixing speed and temperature according to his process equipment. Additionally, the mixing may be carried out under homogenizing and/or particle dividing conditions.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

It is required that in step d) the aqueous suspension obtained in step c) is mixed at a temperature in the range from 30 to 120° C. According to one embodiment, mixing step d) is carried out at a temperature in the range from 45 to 115° C., preferably from 50 to 105° C. and more preferably in the range from 80 to 100° C. For example, mixing step d) is carried out at a temperature of 90° C.±5° C. The advantage of such a temperature during mixing step d) is that the surface treatment agent of the present invention is attached stronger to the surface of the surface-modified calcium carbonate than without implementing such a temperature and thus improves the hydrophobicity of the obtained surface-treated calcium carbonate.

In one embodiment, mixing step d) is carried out for at least 1 s, preferably for at least 1 min, e.g. for at least 10 min, 15 min, 30 min or 45 min. Additionally or alternatively, step d) is carried out for at most 60 min, preferably for at most 45 min, e.g. for at most 30 min.

For example, mixing step d) is carried out for a period of time ranging from 1 second to 60 minutes, preferably for a period of time ranging from 15 minutes to 45 minutes. For example, the mixing step d) is carried out for 30 minutes±5 minutes.

It is appreciated that mixing step d) is preferably carried out at a temperature in the range from 30 to 120° C. and for a period of time ranging from 1 second to 60 minutes.

In one embodiment, step d) is carried out at a temperature in the range from 45 to 115° C., preferably from 50 to 105° C. and more preferably in the range from 80 to 100° C., and/or for a period of time ranging from 1 second to 60 minutes. For example, mixing step d) is carried out at a temperature in the range from 45 to 115° C., preferably from 50 to 105° C. and more preferably in the range from 80 to 100° C., and for a period of time ranging from 1 second to 60 minutes. Alternatively, mixing step d) is carried out at a temperature in the range from 45 to 115° C., preferably from 50 to 105° C. and more preferably in the range from 80 to 100° C., or for a period of time ranging from 1 second to 60 minutes.

It is appreciated that process steps c) and d) may be carried out separately or simultaneously. In one embodiment, process steps c) and d) are carried out separately, i.e. in the given order. Alternatively, process steps c) and d) are carried out simultaneously.

Preferably, process steps c) and d) are carried out simultaneously. This is advantageous as the process can be carried out in a more time-efficient manner.

In one embodiment, mechanical dewatering, preferably by centrifugation or filtration, is carried out during step d), and/or the surface-treated calcium carbonate is washed with water during and/or after step d). For example, mechanical dewatering, preferably by centrifugation or filtration, is carried out during step d), and the surface-treated calcium carbonate is washed with water during and/or after step d), preferably after step d). Alternatively, mechanical dewatering, preferably by centrifugation or filtration, is carried out during step d), or the surface-treated calcium carbonate is washed with water during and/or after step d), preferably after step d).

Such mechanical dewatering may be undertaken by all the techniques and methods well known to the man skilled in the art for reducing the water content of an aqueous suspension. The mechanical dewatering is preferably carried out by centrifugation or filtration, for example, in a vertical plate pressure filter, a tube press or a vacuum filter. Preferably, the mechanical dewatering is carried out under pressure.

The washing may be undertaken by all the techniques and methods well known to the man skilled in the art for washing of the amount of surface treatment agent which is not sufficiently attached from the surface-treated calcium carbonates. The washing, for example, may be carried out by rinsing the surface-treated calcium carbonate, or optionally the mechanical dewatered surface-treated calcium carbonate, with water. Optionally, the surface-treated calcium carbonate, or optionally the mechanical dewatered surface-treated calcium carbonate, is rinsed with a mixture comprising water and an organic solvent that is miscible with water, for example, an organic solvent like ethanol, methanol, acetone, ethylene glycol, glycerine or propanol. The surface-treated calcium carbonate is washed with water during and/or after step d). According to one embodiment, the surface-treated calcium carbonate is washed with water during and after step d). Alternatively, the surface-treated calcium carbonate is washed with water during step d) or after step d), preferably after step d).

Characterization of Step e): Drying the Aqueous Suspension During or after Step d)

According to step e) of the present invention the aqueous suspension is dried during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate.

It is thus required that process step e) is carried out at a temperature in the range from 40 to 160° C. For example, process step e) is carried out at a temperature in the range from 50 to 155° C., preferably from 70 to 150° C. and more preferably from 80 to 145° C. For example, process step e) is carried out at a temperature of 120° C.±5° C.

It is appreciated that process step e) can be carried out at ambient pressure or at reduced pressure. Preferably, the drying is carried out at ambient pressure.

Thus, process step e) is preferably carried out at a temperature in the range from 40 to 160° C. at ambient pressure. For example, process step e) is carried out at a temperature in the range from 50 to 155° C., preferably from 70 to 150° C. and more preferably from 80 to 145° C. at ambient pressure. Preferably, process step e) is carried out at a temperature of 120° C.±5° C. at ambient pressure.

Alternatively, process step e) is carried out at a temperature in the range from 40 to 160° C. at reduced pressure. For example, process step e) is carried out at a temperature in the range from 50 to 155° C., preferably from 70 to 150° C. and more preferably from 80 to 145° C. at reduced pressure. Preferably, process step e) is carried out at a temperature of 120° C.±5° C. at reduced pressure.

According to the present invention, the aqueous suspension is dried during or after step d) until the moisture content of the obtained surface-treated calcium carbonate is in the range from 0.001 to 20 wt.-%, based on the total weight of the surface-treated calcium carbonate.

The "moisture content" is determined gravimetrically as the weight loss at 150° C.

Preferably, drying step e) is carried out until the moisture content of the obtained surface-treated calcium carbonate is in the range from 0.005 to 15 wt.-%, preferably in the range from 0.01 to 10 wt.-% and more preferably from 0.05 to 5 wt.-%, based on the total weight of the surface-treated calcium carbonate.

The inventors surprisingly found out that by the foregoing process it is possible to prepare a surface-treated calcium carbonate having improved surface characteristics, especially a high hydrophobicity. Furthermore, by the process according to the present invention it is possible to provide a surface-treated calcium carbonate wherein the surface treatment agent is attached stronger to the calcium carbonate surface compared to a surface-treated calcium carbonate prepared by conventional processes, especially dry processes. Furthermore, the inventors found that the process according to the present invention can be performed in water and, therefore, organic solvents can be reduced or avoided in the inventive process. Furthermore, the process according to the present invention can be prepared by mixing the educts and, therefore intermediate steps may be avoided in the present process.

Further Process Steps

According to one embodiment of the present invention, the process comprises a further step f) of adding at least one base to the aqueous suspension of step c) to readjust the pH-value to the range from 7.5 to 12, preferably from 8 to 11.5 and most preferably from 8.5 to 11 during or after step d).

The term "at least one" base in the meaning of the present invention means that the base comprises, preferably consists of, one or more base(s).

In one embodiment of the present invention, the at least one base comprises, preferably consists of, one base. Alternatively, the at least one base comprises, preferably consists of, two or more bases. For example, the at least one base comprises, preferably consists of, two or three bases.

Preferably, the at least one base comprises, more preferably consists of, one base.

The at least one base is preferably selected from the group consisting of calcium hydroxide, magnesium hydroxide, sodium hydroxide, potassium hydroxide, lithium hydroxide, ammonium hydroxide, primary, secondary and tertiary amines and mixtures thereof. Preferably, the at least one base is calcium hydroxide and/or sodium hydroxide and/or ammonium hydroxide. Most preferably, the at least one base is calcium hydroxide. Calcium hydroxide is advantageously added as it does not impart foreign cation impurities to the aqueous suspension of surface-modified calcium carbonate.

It is appreciated that the at least one base used in step b) and optional step f) may be the same or different. Preferably, the at least one base used in step b) and optional step f) are the same.

The at least one base may be used in "solid" form or as "liquid" or as "gas".

For example, calcium hydroxide, magnesium hydroxide, sodium hydroxide, potassium hydroxide and lithium hydroxide are solid under standard ambient temperature and pressure (SATP) which refers to a temperature of 298.15 K (25° C.) and an absolute pressure of exactly 100 000 Pa (1 bar, 14.5 psi, 0.98692 atm). If the at least one base is in solid form it can be used in process step f) for example as powder, tablet, granules, flakes etc.

However, the solid base may also be dissolved/dispersed/suspended in water and used as solution or suspension or dispersion in process step f), i.e. as a liquid.

The addition of the at least one base in process step f) can be accomplished by any conventional means known to the skilled person. In this regard, reference is made to the statements provided above when discussing the technical details of the at least one base added in process step b) of the present invention.

It is appreciated that process step f) can be carried out during or after step d), preferably during step d).

According to a preferred embodiment, the present invention thus refers to a process for the surface treatment of a surface-modified calcium carbonate, the process comprising the steps of:

a) providing an aqueous suspension of at least one surface-modified calcium carbonate having solids content in the range from 5 to 80 wt.-%, based on the total weight of the aqueous suspension;
b) adjusting the pH-value of the aqueous suspension of step a) to a range from 7.5 to 12;
c) adding at least one surface treatment agent to the aqueous suspension obtained in step b) in an amount ranging from 0.05 to 10 mg surface treatment agent per m² of the accessible surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;
d) mixing the aqueous suspension obtained in step c) at a temperature in the range from 30 to 120° C.;
e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate; and
f) adding at least one base to the aqueous suspension of step c) to readjust the pH-value to the range from 7.5 to 12 during or after step d).

According to one embodiment of the present invention the process comprises a further step g) after or during step e) of deagglomerating the surface-treated calcium carbonate of step d) or e), and preferably step g) is carried out during step e). For example, the process comprises a further step g) after step e) of deagglomerating the surface-treated calcium carbonate of step d) or e). Alternatively, the process comprises a further step g) during step e) of deagglomerating the surface-treated calcium carbonate of step d) or e).

The term "deagglomerating" in the meaning of the present invention refers to the breaking up of agglomerates which may have formed during the dewatering step and/or the drying step.

The deagglomerating may be carried out by any process known to the skilled man that is suitable for deagglomeration. For example, the deagglomeration step may be a dry grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man.

According to a preferred embodiment, the present invention thus refers to a process for the surface treatment of a surface-modified calcium carbonate, the process comprising the steps of:
a) providing an aqueous suspension of at least one surface-modified calcium carbonate having solids content in the range from 5 to 80 wt.-%, based on the total weight of the aqueous suspension;
b) adjusting the pH-value of the aqueous suspension of step a) to a range from 7.5 to 12;
c) adding at least one surface treatment agent to the aqueous suspension obtained in step b) in an amount ranging from 0.05 to 10 mg surface treatment agent per m² of the accessible surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;
d) mixing the aqueous suspension obtained in step c) at a temperature in the range from 30 to 120° C.; and
e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate; and
f) optionally adding at least one base to the aqueous suspension of step c) to readjust the pH-value to the range from 7.5 to 12 during or after step d); and
g) deagglomerating the surface-treated calcium carbonate of step d) or e) after or during step e).

In one preferred embodiment of the present invention, the inventive process may be a continuous process. In this case, it is possible to contact the aqueous suspension of the at least one surface-modified calcium carbonate of step a) with the at least one base of step b) and the at least one surface treatment agent of step c) in a constant flow, so that a constant concentration of the at least one surface-modified calcium carbonate of step a) the at least one base of step b), and the at least one surface treatment agent of step c) is provided.

Alternatively, the aqueous suspension of the at least one surface-modified calcium carbonate of step a) is contacted with the at least one base of step b) and the at least one surface treatment agent of step c) in one step, wherein said at least one surface treatment agent is preferably added in one portion.

In another embodiment of the present invention, the inventive process may be a batch process, i.e. the aqueous suspension of the at least one surface-modified calcium carbonate of step a) is contacted with the at least one base of step b) and the at least one surface treatment agent of step c) in more than one steps, wherein said surface treatment agent is preferably added in about equal portions. Alternatively, it is also possible to add the at least one surface treatment agent in unequal portions to the aqueous suspension obtained in step b), i.e. in larger and smaller portions.

According to one embodiment of the present invention all process steps are fully or partially batch or continuous processes, wherein a batch process is preferred for steps a) to d), and if present step f), and a continuous process is preferred for step e).

Surface-Treated Calcium Carbonate

According to one aspect of the present invention, a surface-treated calcium carbonate obtainable by the process according to the present invention is provided.

Thus, the surface-treated calcium carbonate of the present invention is obtainable by a process comprising the following steps:
a) providing an aqueous suspension of at least one surface-modified calcium carbonate having solids content in the range from 5 to 80 wt.-%, based on the total weight of the aqueous suspension;
b) adjusting the pH-value of the aqueous suspension of step a) to a range from 7.5 to 12;

c) adding at least one surface treatment agent to the aqueous suspension obtained in step b) in an amount ranging from 0.05 to 10 mg surface treatment agent per m² of the accessible surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;

d) mixing the aqueous suspension obtained in step c) at a temperature in the range from 30 to 120° C.; and e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate.

According to one embodiment, the surface-treated calcium carbonate of the present invention is obtainable by a process comprising the following steps:

a) providing an aqueous suspension of at least one surface-modified calcium carbonate having solids content in the range from 5 to 80 wt.-%, based on the total weight of the aqueous suspension;

b) adjusting the pH-value of the aqueous suspension of step a) to a range from 7.5 to 12;

c) adding at least one surface treatment agent to the aqueous suspension obtained in step b) in an amount ranging from 0.05 to 10 mg surface treatment agent per m² of the accessible surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;

d) mixing the aqueous suspension obtained in step c) at a temperature in the range from 30 to 120° C.;

e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate; and f) adding at least one base to the aqueous suspension of step c) to readjust the pH-value to the range from 7.5 to 12 during or after step d); and/or g) deagglomerating the surface-treated calcium carbonate of step d) or e) after or during step e).

According to another aspect of the present invention, a surface-treated calcium carbonate is provided. The surface-treated calcium carbonate comprises a) a surface-modified calcium carbonate, wherein the surface-modified calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source, and b) a surface treatment agent is located as a treatment layer on at least a part of the surface of the surface-modified calcium carbonate, wherein the treatment layer consists of a treatment agent selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof, and/or reaction products thereof, and the total weight of the surface treatment agent on the total surface area of the surface-modified calcium carbonate is from 0.05 to 10 mg/m², based on the surface-modified calcium carbonate of step a).

With regard to the definition of the surface-treated calcium carbonate, the surface-modified calcium carbonate, the surface treatment agent and preferred embodiments thereof, reference is made to the statements provided above when discussing the technical details of the process of the present invention.

The term "reaction products" in the meaning of the present invention refers to products obtained by contacting the at least one surface-modified calcium carbonate with the at least one surface treatment agent, i.e. the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof. Said reaction products are formed between at least a part of the applied surface treatment agent and reactive molecules located at the surface of the surface-modified calcium carbonate particles.

It is appreciated that the inventive surface-treated calcium carbonate, has improved surface characteristics, and especially a high hydrophobicity.

According to one embodiment of the present invention the surface-treated calcium carbonate according to the present invention has a hydrophobicity of below 2.3:1 volumetric ratio of water:ethanol measured at +23° C. (±2° C.) with the sedimentation method. For example, the surface-treated calcium carbonate according to the present invention has a hydrophobicity of below 2.2:1, preferably of below 2.1:1 and most preferably of below 2.0:1 volumetric ratio of water:ethanol measured at +23° C. (±2° C.) with the sedimentation method. For example the surface-treated calcium carbonate has a hydrophobicity of 1.9:1 volumetric ratio of water:ethanol measured at +23° C. (±2° C.) with the sedimentation method. Most preferably, the surface-treated calcium carbonate has a hydrophobicity in the range of 1:1 to 1.9:1 volumetric ratio of water:ethanol measured at +23° C. (±2° C.) with the sedimentation method.

Furthermore, the inventors surprisingly found that the surface treatment agent is attached stronger to the surface of the surface-modified calcium carbonate of the present invention compared to surface-treated calcium carbonates prepared by conventional processes, especially dry processes.

Use of the Surface-Treated Calcium Carbonate

According to the another aspect of the present invention the use of the surface-treated calcium carbonate in a polymer composition, in paper making, paper coatings, agricultural applications, paints, adhesives, sealants, construction applications, pharma applications and/or cosmetic applications is provided.

According to another aspect, the surface-treated calcium carbonate that has been surface treated with at least one surface treatment agent being selected from the group consisting of mono- or di-substituted maleic anhydride containing compounds, fully or partially neutralized mono- or di-substituted succinic anhydride containing compounds, unsaturated fatty acids, salts of unsaturated fatty acids, unsaturated esters of phosphoric acid, salts of unsaturated phosphoric acid esters, abietic acid, salts of abietic acid and mixtures thereof, is used for cross-linking of rubber, in sheet moulding compounds, in bulk moulding compounds, in cross-linkable polyolefin system formulations, preferably for pipes and cables, in cross-linkable polyvinyl chloride, in unsaturated polyesters and in alkyd resins.

Thus, it is appreciated that the surface-treated calcium carbonate of the present invention is preferably used in a surrounding material such that the surface-treated calcium carbonate, i.e. the surface treatment agent that is located on the surface of the surface-modified calcium carbonate, undergoes a reaction with the surrounding material.

The term "surrounding material" in the meaning of the present invention refers to a matrix material that comprises the surface-treated calcium carbonate.

As already set out above the inventors surprisingly found that the surface treatment agent is attached stronger to the surface-modified calcium carbonate of the present invention compared to surface-treated calcium carbonates prepared by conventional processes, especially dry processes.

If the surface-treated calcium carbonate of the present invention is used in a final application product such as a polymer composition, in paper making, paper coatings, agricultural applications, paints, adhesives, sealants, construction applications, pharma applications and/or cosmetic applications or is used for cross-linking of rubber, in sheet moulding compounds, in bulk moulding compounds, in cross-linkable polyolefin system formulations, preferably for pipes and cables, in cross-linkable polyvinyl chloride, in unsaturated polyesters and in alkyd resins, this will lead to an improved quality of the product compared to the same product, wherein a surface-treated calcium carbonate prepared by conventional processes, especially dry processes, is used. Due to the stronger attachment of the surface treatment agent on the surface of the surface-modified calcium carbonate, lower amounts of the surface treatment agent detach from the surface-modified calcium carbonate. This is desirably since detached surface treatment agent may be present as "free" surface treatment agent in the product and may have a negative impact on such a product, e.g. on the mechanical and/or optical properties.

According to a further aspect, the surface-treated calcium carbonate and a curing agent for cross-linking of cross-linkable compounds is provided, wherein the curing agent is a peroxide or a curing agent based on sulphur. Preferably, the cross-linkable compounds are selected from rubber, polyolefin system formulations, polyvinyl chloride, unsaturated polyesters and alkyd resins.

A rubber according to the present invention is any natural or synthetic rubber. For example, the rubber may be an ethylene-propylene rubber (EPR), ethylene-propylene-diene rubber (EPDM), natural rubber (NR), butyl rubber, polyacrylate rubber, styrene-butadiene rubber and mixtures thereof.

A polyolefin system formulation according to the present invention is any of a class of polymers produced from a simple olefin (also called an alkene with the general formula $C_nH_{2n}$) as a monomer. For example, polyethylene is the polyolefin produced by polymerizing the olefin ethylene. Polypropylene is another common polyolefin which is made from the olefin propylene.

A polyvinylchloride (PVC) comprises a polyvinyl chloride homopolymer or a copolymer of vinyl chloride with a copolymerizable ethylenically unsaturated monomer. In case a homopolymer of polyvinylchloride is provided, the polyvinyl chloride resin contains monomers consisting of vinyl chloride alone.

Further details about the polyvinylchloride are disclosed in e.g. EP 2 612 881 A1, the content of this reference is incorporated into the present application by reference.

An unsaturated polyester according to the present invention refers to polymers that contain an ester functional group in their main chain. Unsaturated polyesters used according to the invention are prepared by condensing a dicarboxylic acid or its anhydride containing $\alpha,\beta$-ethylenic unsaturation or mixtures of these with a dialcohol or a mixture of dialcohols or their ethers. Examples of unsaturated dicarboxylic acids or anhydrides include maleic anhydride, fumaric acid, itaconic acid, citraconic acid and chloromaleic acid. A small proportion of the unsaturated dicarboxylic acid (up to 25 mol-%) may be replaced with saturated dicarboxylic acids such as ortho-phthalic, isophthalic, terephthalic, succinic, adipic, sebacic or methylsuccinic acids, and the like. The dialcohols or their ethers may be selected from the group comprising 1,2-propanediol (propylene glycol), dipropylene glycol, diethylene glycol, ethylene glycol, 1,3-butanediol, 1,4-butanediol, neopentyl glycol, triethylene glycol, tripropylene glycol, ethylene oxide and mixtures thereof. Preferably, the unsaturated polyester is a poly(propylene fumarate), poly(ethylene propylene fumarate), poly(dipropylene fumarate), poly(propylene dipropylene fumarate), poly(propylene isophthalate/fumarate), and the like.

An alkyd resins according to the present invention refer to polymers that are prepared from fatty acids and triglyceride oils. The alkyd resin may be modified with phenolic resin, styrene, vinyl toluene, acrylic monomers, or polyurethanes.

The curing agent is a peroxide or the curing agent is based on sulphur.

If the curing agent is a peroxide, the curing agent can be selected from a very wide range, including peresters, perketals, hydroperoxides, peroxydicarbonates, diacyl peroxides and ketone peroxides. Examples of such peroxides include t-butyl peroctanoate, perbenzoate, methyl ethyl ketone peroxide, cyclohexanone peroxide, acetyl acetone peroxide, dibenzoyl peroxide, bis(4-t-butylcyclohexyl) peroxydicarbonate and the like. If desired, a mixture of two or more peroxides can be used.

The sulphur based curing agent can be elemental sulphur or a sulphur-containing system such as thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanadine, N,N-di-(2-methylphenyl)-guanadine, thiazole accelerators such as 2-mercaptobenzothiazole, 2-(morpholinodithio)benzothiazole disulfide, zinc 2-mercaptobenzothiazole and the like; dithiocarbamates accelerators such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate and zinc dimethyldithiocarbamate. If desired, a mixture of two or more sulphur based curing agents can be used.

A "cross-linking reaction" according to the present invention is defined as a reaction between the surrounding material and a double bond of the surface treatment agent that is located on the surface of the surface-modified calcium carbonate. Due to this reaction a bond is created between the surrounding material and the surface treatment agent that is located on the surface of the surface-modified calcium carbonate, wherein the bond is a covalent chemical bond or an ionic bond.

The scope and interest of the present invention will be better understood based on the following examples which are intended to illustrate certain embodiments of the present invention and are non-limitative.

EXAMPLES

1 Measurement Methods

In the following the measurement methods implemented in the examples are described.

Moisture Content of Calcium Carbonate

A 10 g powder sample was heated in an oven at 150° C. until the mass is constant for 20 minutes. The mass loss was determined gravimetrically and is expressed as wt.-% loss based on the initial sample mass. This mass loss has been attributed to the sample humidity.

Moisture Pick Up Susceptibility

The moisture pick up susceptibility of a material as referred to herein was determined in mg moisture/g after exposure to an atmosphere of 10 and 85% relative humidity, respectively, for 2.5 hours at a temperature of +23° C. (±2° C.). For this purpose, the sample was first kept at an atmosphere of 10% relative humidity for 2.5 hours, then the atmosphere is changed to 85% relative humidity at which the sample is kept for another 2.5 hours. The weight increase between 10 and 85% relative humidity was then used to calculate the moisture pick-up in mg moisture/g of sample.

The moisture pick up susceptibility in mg/g divided by the specific surface area in $m^2/g$ (calculated based on the specific surface area BET) corresponds to the "normalized moisture pick up susceptibility" expressed in $mg/m^2$ of sample.

Volatile Onset Temperature

The "volatile onset temperature" was determined by analysis of the thermogravimetric analysis (TGA) curve. TGA analysis described hereafter—begin to evolve, as observed on a TGA curve, plotting the mass of remaining sample (y-axis) as a function of temperature (x-axis), the preparation and interpretation of such a curve being defined hereafter. TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. TGA was performed using a Mettler Toledo TGA 851 based on a sample of 500+/−50 mg and scanning temperatures from 25 to 550° C. at a rate of 20° C./minute under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 150° C. is identified. The temperature value associated with this lowest temperature inflection point of the first derivative curve is the "volatile onset temperature".

Hydrophobicity

Various mixtures of different water and ethanol were prepared. The reported data are based on volume/volume ratios. The different steps are listed hereafter:

a) A 100 mL glass beaker was filled with 50 ml of a water/ethanol mixture.

b) Through a sieve (mesh size: approximately 1 mm) 0.5 g of the coated mineral material was added on the top of the liquid surface.

c) After 30 seconds the amount of material which sank to the bottom of the beaker was identified (visual estimation).

The procedure was repeated with different water/ethanol blends until the composition was identified where 50% of the material sinks to the bottom of the beaker.

pH

The pH of a suspension was measured at 23±2° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Solids Content

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Specific Surface Area BET

The specific surface area was measured via the BET method according to ISO 9277:2010 using nitrogen, following conditioning of the sample by heating at 250° C. for a period of 30 minutes. Prior to such measurements, the sample was filtered within a Buchner funnel, rinsed with deionised water and dried overnight at 90 to 100° C. in an oven. Subsequently the dry cake was ground thoroughly in a mortar and the resulting powder placed in a moisture balance at 130° C. until a constant weight was reached. The specific surface area was measured before any surface treatment. We assume that the surface treatment does not alter the BET surface area.

Particle Size Distribution (Volume % Particles with a Diameter <X), $d_{50}$ Value (Volume Median Grain Diameter) and $d_{98}$ Value of a Particulate Material:

Volume median grain diameter $d_{50}$ was evaluated using a Malvern Mastersizer 2000 Laser Diffraction System (Malvern Instruments Plc., Great Britain) using the Mie theory, with a particle refractive index of 1.57 and an absorption index of 0.005. The method and instrument are known to the skilled person and are commonly used to determine particle sizes of fillers and other particulate materials.

Brookfield Viscosity

The Brookfield viscosity was measured one hour after the production and after one minute of stirring at 25° C.±1° C. at 100 rpm by the use of a Brookfield viscometer type RVT equipped with an appropriate disc spindle, for example spindle 2 to 5.

Iodine Number

The iodine number was measured according to DIN 53241/1.

Acid Number

The acid number was measured according to ASTM D 974.

Intra Particle Intruded Specific Pore Volume

The intra-particle intruded specific pore volume has been calculated from a mercury intrusion porosimetry measurement using a Micromeritics Autopore IV 9500 mercury porosimeter having a maximum applied pressure of mercury 414 MPa (60 000 psi), equivalent to a Laplace throat diameter of 0.004 μm. The equilibration time used at each pressure step is 20 seconds. The sample material is sealed in a 5 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal. The sum of these three regions gives the total overall pore volume of the powder, but depends strongly on the original sample compaction/settling of the powder at the coarse pore end of the distribution. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

2 Starting Materials 2.1 Surface Treatment Agent

TABLE 1

Surface treatment agents.

| Treatment agent | Name | Supplier | Properties |
|---|---|---|---|
| 1 | Ricon 130MA08 (low molecular weight polybutadiene functionalized with maleic anhydride) | Cray Valley | Viscosity: 6 500 ± 3 500 mPa · s (25° C.) (*)<br>Acid number: 40.1 – 51.5 meq KOH/g(*)<br>Iodine number: 114 ± 3 (**) |
| 2 | Ricon 156MA17 (low molecular weight polybutadiene functionalized with maleic anhydride) | Cray Valley | Viscosity: 140 000 mPa * s (55° C.) (*)<br>Acid number: 91.6 – 103 meq KOH/g (*)<br>Iodine number: 121 ± 4 (**) |
| 3 | Linoleic acid (CAS 60-33-3) | Aldrich order number: 62240-1L-F | |

(*) according to the technical data sheet from the supplier;
(**) measured by applicant.

Samples of the treatment agents 1 to 3 according to Table 1 were completely neutralized as follows: Said treatment agents were each individually contacted with demineralized water in a 50/50 wt.-% ratio and heated under steering to 90° C. (+/−5° C.). Upon continuous stirring and heating the suspension was adjusted with a 30 wt.-% aqueous solution of sodium hydroxide to a pH of 11 (+/−0.3). The addition of sodium hydroxide was stopped once the pH was stable at 11+/−0.3 units for 20 minutes.

In Table 3 the surface treatment agents which have been completely neutralized with sodium hydroxide prior surface coating of the surface-modified calcium carbonate (MCC) are marked with the ending-Na after the name according to Table 1.

2.2 Surface-Modified Calcium Carbonate (=MCC)

TABLE 2

Surface-modified calcium carbonates

| Sample | Intra-particle intruded specific pore volume (cm³/g) | BET surface area [mg/m²] | $d_{50}$ [μm] | Humidity [wt.-%] |
|---|---|---|---|---|
| A | 0.864 | 139 | 4.53 | 6.77 |
| B | 0.281 | 37 | 2.42 | 1.58 |

Experiments:
Dry Treatment Process 400 g of surface modified calcium carbonate A were mixed for 10 minutes at 120° C. in the MTI mixer (at 3 000 rpm). The surface treatment agent (according to Table 1) was added and the blend was mixed for further 10 minutes at 120° C. and 3 000 rpm. After cooling down to room temperature the sample was removed from the mixer and stored in a sealed container.

Wet Treatment Process 400 g of sample A were mixed with 1 600 g deionized water in order to obtain an aqueous suspension of approximately 20 wt.-%, based on the total weight of the suspension. The suspension was stirred with a VISCO JET CRACK steered of 12 cm diameter (300 to 500 rpm; VISCO JET Rührsysteme GmbH, Germany) at room temperature. The pH was adjusted with an aqueous solution of the base according to Table 3. The pH adjustment was stopped when the targeted pH was stable within +/−0.2 units for 5 minutes, the reported pH values are the end values.

The suspension was heated to 90° C. (+/−5° C.) under constant stirring. The surface treatment agent as specified in Table 3 was added over a period of approximately 3 minutes. The blend was further stirred for 30 minutes at 90° C. The suspension was then dried in an oven for 10 hours at 120° C. to a moisture content of below 1 wt.-%. The resulting dry crumbles were de-agglomerated in an IKA A 11 basic analytical mill for 5 minutes and stored afterwards in a sealed container.

surface-treated calcium carbonate sink, the hydrophobicity of the filler is low, whereas a lower amount of water in the water/ethanol blend for letting 50 the surface-treated calcium carbonate sink means that the filler has a high hydrophobicity. The hydrophobicity of the surface-treated calcium carbonate (filler) correlates directly with the quality of the surface treatment of the surface-treated calcium carbonate. The comparison of the inventive trials 7 to 9, 11 and 13 with the comparative examples 1 to 6, 10 and 12 shows that the process according to the present invention allows to manufacture a filler with an improved hydrophobicity. In other words, by applying the inventive process, fillers with an improved quality of surface-treatment can be obtained.

The invention claimed is:

1. A process for the surface treatment of a surface-modified calcium carbonate, the process comprising the steps of:
   a) providing an aqueous suspension of at least one surface-modified calcium carbonate having solids content in the range from 5 to 80 wt.-%, based on the total weight of the aqueous suspension;
   b) adjusting the pH-value of the aqueous suspension of step a) to a range from 7.5 to 12;
   c) adding at least one surface treatment agent to the aqueous suspension obtained in step b) in an amount ranging from 0.05 to 10 mg surface treatment agent per m² of the accessible surface area of the surface-modified calcium carbonate as provided in step a), the at least one surface treatment agent is selected from the group consisting of mono- or di-substituted succinic anhydride containing compounds, mono- or di-substituted succinic acid containing compounds, mono- or di-substituted succinic acid salts containing compounds; unsaturated fatty acids, salts of unsaturated fatty acids; unsaturated esters of phosphoric acid, salts of unsaturated phosphoric acid esters; abietic acid, salts of abietic acid and mixtures thereof;
   d) mixing the aqueous suspension obtained in step c) at a temperature in the range from 30 to 120° C.; and

TABLE 3

Summary and results.

| Trial | MCC | Surface treatment agent | Surface treatment agent dosage [wt.-%] | Treatment process | Suspension pH | Base for the pH adjustment | Hydrophobicity |
|---|---|---|---|---|---|---|---|
| 1 (comp.) | A | Ricon 130MA08 | 2 | dry | n.d. | — | 80/20 |
| 2 (comp.) | A | Ricon 130MA08-Na | 2 | dry | n.d. | NaOH | 90/10 |
| 3 (comp.) | A | Ricon 130MA08 | 2 | wet | 7 | — | 90/10 |
| 4 (comp.) | A | Ricon 130MA08-Na | 2 | wet | 7 | — | 75/25 |
| 5 (inventive) | A | Ricon 130MA08 | 2 | wet | 10.5 | Ca(OH)₂ | 75/25 |
| 6 (comp.) | A | Ricon 130MA08-Na | 2 | wet | >12 | Ca(OH)₂ | 85/15 |
| 7 (inventive) | A | Ricon 156MA17-Na | 2 | wet | 10.5 | NaOH | 60/40 |
| 8 (inventive) | A | Ricon 130MA08-Na | 2 | wet | 10.5 | Ca(OH)₂ | 55/45 |
| 9 (inventive) | A | Ricon 130MA08-Na | 4 | wet | 10.3 | Ca(OH)₂ | 65/35 |
| 10 (comp.) | A | Linoleic acid | 2 | dry | n.d. | — | 70/30 |
| 11 (inventive) | A | Linoleic acid-Na | 2 | wet | 11 | Ca(OH)₂ | 55/45 |
| 12 (comp.) | B | Ricon 130MA08-Na | 2 | wet | >12 | Ca(OH)₂ | 95/5 |
| 13 (inventive) | B | Ricon 130MA08-Na | 2 | wet | 8 | — | 75/25 |

Comp. = Comparative Example,
n.d. = not determined.

The hydrophobicity as given in Table 3 is expressed as the water/ethanol ratio at which 50 wt.-% of the surface-treated calcium carbonate sinks. In case that a high water content in the water/ethanol blend is needed to let 50 wt.-% of the e) drying the aqueous suspension during or after step d) at a temperature in the range from 40 to 160° C. at ambient or reduced pressure until the moisture content of the obtained surface-treated calcium carbonate is in the range from 0.001 to 20 wt.-%, based on the total weight of the surface-treated calcium carbonate.

2. The process according to claim 1, wherein the pH-value in step b) is adjusted by adding at least one base to the aqueous suspension of step a).

3. The process according to claim 1, wherein the process comprises a further step f) of adding at least one base to the aqueous suspension of step c) to readjust the pH-value to the range from 7.5 to 12 during or after step d).

4. The process according claim 1, wherein the mono- or di-substituted succinic anhydride containing compounds, mono- or di-substituted succinic acid containing compounds or mono- or di-substituted succinic acid salts containing compounds comprise substituent(s) $R^1$ and/or $R^2$ comprising a cross-linkable double bond.

5. The process according to claim 1, wherein the solids content of the aqueous suspension of step a) is in the range from 10 to 70 wt.-% based on the total weight of the aqueous suspension; and/or the specific surface area of the surface-modified calcium carbonate as measured by the BET nitrogen method is in the range from 20 to 250 m$^2$/g.

6. The process according to claim 1, wherein the at least one base added in step b) is selected from the group consisting of calcium hydroxide, magnesium hydroxide, calcium hydrogen carbonate, sodium hydroxide, potassium hydroxide, lithium hydroxide, ammonium hydroxide, primary, secondary and tertiary amines and mixtures thereof.

7. The process according to claim 1, wherein the pH-value of the aqueous suspension of step a) is adjusted in process step b) to the range from 7.8 to 11.5.

8. The process according to claim 1, wherein the amount of the at least one surface treatment agent added in step c) is in the range from 0.07 to 9 mg surface treatment agent per m$^2$ of the accessible surface area of the surface-modified calcium carbonate.

9. The process according to claim 1, wherein the at least one surface treatment agent is
   a) selected from the group consisting of sodium, potassium, calcium, magnesium, lithium, strontium, primary amine, secondary amine, tertiary amine and/or ammonium salts, whereby the amine salts are linear or cyclic, of mono- or di-substituted succinic acids, whereby none, one, or both acid groups are in the salt form; unsaturated fatty acids, oleic acid, and/or linoleic acid; unsaturated esters of phosphoric acid; abietic acid; and/or mixtures thereof; and/or
   b) maleinized polybutadiene having a Brookfield viscosity at 25° C. in the range from 1,000 to 300,000 mPa, and/or an acid number in the range from 10 to 300 mg potassium hydroxide per g maleinized polybutadiene and/or an iodine number in the range from 100 to 1 000 g iodine per 100 g maleinized polybutadiene; and/or
   c) polyisobutylene succinic anhydride having a Brookfield viscosity at 25° C. in the range from 1 000 to 300 000 mPa's and/or an acid number in the range from 10 to 80 mg potassium hydroxide per g polyisobutylene succinic anhydride.

10. The process according to claim 1, wherein step d) is carried out at a temperature in the range from 45 to 115° C., and/or for a period of time ranging from 1 second to 60 minutes.

11. The process according to claim 1, wherein step e) is carried out until the moisture content of the obtained surface-treated calcium carbonate is in the range from 0.005 to 15 wt.-%, based on the total weight of the surface-treated calcium carbonate.

12. The process according to claim 1, wherein step e) is carried out at a temperature in the range from 50 to 155° C.

13. The process according to claim 3, wherein the at least one base added in step f) is selected from the group consisting of lithium hydroxide, sodium hydroxide, potassium hydroxide, calcium hydroxide, magnesium hydroxide and/or mixtures thereof.

14. The process according to claim 1, wherein the process comprises a further step g) after or during step e) of deagglomerating the surface-treated calcium carbonate of step d) or e).

15. The process according to claim 1, wherein all process steps are fully or partially batch or continuous processes.

16. A surface-treated calcium carbonate obtained by a process according to claim 1.

17. A product comprising the surface-treated calcium carbonate according to claim 16, wherein the product is a polymer composition, paper, a paper coating, an agricultural product, paint, an adhesive, a sealant, a construction product, a pharmaceutical product, or a cosmetic product.

18. A product comprising the surface-treated calcium carbonate according to claim 16, wherein the product is rubber, a sheet moulding compound, a bulk moulding compound, a cross-linkable polyolefin, a pipe, a cable, a cross-linkable polyvinyl chloride, an unsaturated polyester, or an alkyd resin, wherein the surface-treated calcium carbonate has been surface treated with at least one surface treatment agent being selected from the group consisting of mono- or di-substituted maleic anhydride containing compounds, fully or partially neutralized mono- or di-substituted succinic anhydride containing compounds, unsaturated fatty acids, salts of unsaturated fatty acids, unsaturated esters of phosphoric acid, salts of unsaturated phosphoric acid esters, abietic acid, salts of abietic acid and mixtures thereof.

19. A product comprising the surface-treated calcium carbonate according to claim 16 and a curing agent for crosslinking of cross-linkable compounds, wherein the curing agent comprises rubber, polyolefin system formulations, polyvinyl chloride, unsaturated polyesters and alkyd resins, a peroxide, and/or the curing agent is based on sulphur.

20. The process according to claim 1, wherein the surface-modified calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

* * * * *